(12) United States Patent
Escue

(10) Patent No.: US 9,811,179 B2
(45) Date of Patent: Nov. 7, 2017

(54) TOUCH SCREEN DEVICE AID

(71) Applicant: Erika Escue, Holland, OH (US)

(72) Inventor: Erika Escue, Holland, OH (US)

( * ) Notice: Subject to any disclaimer, the term of this patent is extended or adjusted under 35 U.S.C. 154(b) by 0 days.

(21) Appl. No.: 14/554,282

(22) Filed: Nov. 26, 2014

(65) Prior Publication Data

US 2015/0153849 A1 Jun. 4, 2015

Related U.S. Application Data

(60) Provisional application No. 61/909,827, filed on Nov. 27, 2013.

(51) Int. Cl.
*G06F 3/0354* (2013.01)

(52) U.S. Cl.
CPC .. *G06F 3/03545* (2013.01); *G06F 2203/0331* (2013.01)

(58) Field of Classification Search
CPC .................. G06F 2203/0331; G06F 3/03545
See application file for complete search history.

(56) References Cited

U.S. PATENT DOCUMENTS

| | | | |
|---|---|---|---|
| 1,380,960 | A | 6/1921 | Hmenia |
| D168,689 | S | 1/1953 | Jones |
| 5,598,584 | A | 2/1997 | Da Grossa |
| 6,075,189 | A | 6/2000 | Robb |
| 6,225,988 | B1 | 5/2001 | Robb |
| 6,533,480 | B2 | 3/2003 | Schneider |
| D488,588 | S | 4/2004 | Murphy |
| 7,884,797 | B1 | 2/2011 | Ning |
| 8,336,119 | B2 | 12/2012 | Phelps et al. |
| 2005/0231471 | A1 | 10/2005 | Mallard et al. |
| 2009/0078478 | A1* | 3/2009 | Newman ............. G06F 3/03545 178/19.01 |
| 2009/0183297 | A1* | 7/2009 | Drosihn ............. A41D 19/0024 2/167 |
| 2010/0039392 | A1 | 2/2010 | Pratt et al. |
| 2010/0090966 | A1 | 4/2010 | Gregorio |
| 2011/0016609 | A1* | 1/2011 | Phelps ............... A41D 19/0024 2/162 |
| 2011/0273406 | A1 | 11/2011 | Brailey |

(Continued)

FOREIGN PATENT DOCUMENTS

| | | |
|---|---|---|
| DE | 20 2011 109 508 U1 | 5/2013 |
| WO | 2008/099205 A1 | 8/2008 |

*Primary Examiner* — Kenneth Bukowski
(74) *Attorney, Agent, or Firm* — Brinks Gilson & Lione

(57) ABSTRACT

A device for aiding in the activation of a touchscreen includes an attachment portion and a conductive nipple coupled to and extending through the attachment portion. The attachment portion can include a plurality of non-conductive layers that are configured to attach to the fingertip of a user. The attachment portion can be generally flexible and include an adhesive layer for attaching the device to the tip of a user's finger. The attachment portion can also be in the form of a flexible sleeve that will extend over the user's finger. The sleeve can include a hole in the tip for allowing a user's fingernail to extend therethrough. The conductive nipple will transfer the conductive energy of the user's skin therethrough, allowing a focused point of activation on the touchscreen. The attachment portion can also include a fingerprint reader, microprocessor, and storage medium embedded therein.

20 Claims, 10 Drawing Sheets

(56) References Cited

U.S. PATENT DOCUMENTS

| | | | |
|---|---|---|---|
| 2011/0277215 A1 | 11/2011 | Lee et al. | |
| 2012/0103770 A1 | 5/2012 | Warinner | |
| 2012/0159684 A1 | 6/2012 | Jiang et al. | |
| 2012/0274548 A1* | 11/2012 | Molen | G06F 3/014 345/156 |
| 2013/0127791 A1* | 5/2013 | Siuta | G06F 3/03545 345/179 |
| 2014/0062895 A1* | 3/2014 | Chakra | G06F 3/03545 345/173 |
| 2014/0078118 A1* | 3/2014 | Robb | G06F 3/039 345/179 |
| 2014/0267116 A1* | 9/2014 | Weiner | A61F 5/05866 345/173 |

* cited by examiner

TOUCH SCREEN DEVICE AID

CROSS-REFERENCE TO RELATED APPLICATIONS

This application claims the benefit of U.S. Provisional Application No. 61/909,827, filed Nov. 27, 2013, which is hereby incorporated by reference in its entirety herein.

BACKGROUND

Consumer electronic devices, such as cellphones, smartphones, handheld computers, tablet computers, and the like are well known in the art. These consumer devices often rely on the use of touch screen technology to receive inputs from the user in addition to, or as an alternative to, physical buttons.

One type of touchscreen technology is a resistive touch screen. These screens include a pair of screens that are separated by a small gap. When pressed together by a stylus, finger, or other pointing device, the screens will touch and register the location of the input. Thus, these touchscreens generally rely on pressure to register an input. However, these screens can be expensive, and may not respond well to lighter pressure touch inputs.

Another type of touchscreen technology is a capacitive touch screen. These screens have become more popular than the resistive touch screen. The capacitive touch screen does not include two layers that are pressed together, but rather responds to the natural electric current of a user's body. These screens generally require barehanded operation to ensure that that body's natural electric current is detected.

However, capacitive touch screens can be difficult to use for some users. In one case, a user's fingertip may be too wide to register the desired input location, causing inputs to be received at an undesired location. This is commonly referred to as a "fat-finger" problem. In other cases, the use of artificial nails can be problematic, because the artificial nails do not possess a natural electric current, forcing the user to rely on the pad of the finger, which in turn results in the "fat-finger" issues mentioned above.

Additionally, touch screen technology is widely available on public devices, such as ATM screens, point-of-sale interfaces, self-checkout aisles, airline check-in, and the like. These public screens can become exposed to germs and other pathogens, and can be transmitted from one user to the next.

SUMMARY

To aid in the use of touchscreen devices, a device is provided having an attachment portion configured for being removably attached to an end of the user's digit, the attachment portion including at least one flexible layer, the at least one flexible layer being non-conductive. The devices further includes a conductive nipple coupled to the attachment portion, the conductive nipple including an inner end and an outer end, the inner end being configured for contacting a portion of skin of the user's digit when the attachment portion is attached to the user's digit, the outer end being configured for activating a touchscreen. The conductive nipple extends through the at least one layer through an opening defined by the at least one flexible layer.

The at least one layer can be a plurality of layers. The plurality of layers may include a bottom layer, an intermediate layer, and a top layer, wherein the bottom layer is configured to contact the user's skin. The bottom layer can be an adhesive. The top layer can be flocking material.

In one form, the conductive nipple has a complex curvature having a convex portion transitioning into a concave portion transitioning into a rounded tip. In one approach, the convex portion is wider than the concave portion. In one aspect, the rounded tip is disposed at the outer end of the conductive nipple, and the convex portion defines a base that is disposed at the inner end of the conductive nipple. In one form, the rounded tip is smoother than the remainder of the nipple.

In one approach, the device includes a second conductive nipple extending through a second opening in the at least one layer.

In one form, the conductive nipple protrudes from one side of the at least one layer and is generally flush with the opposite side of the at least one layer.

In one approach, the at least one layer is silicone, fabric, urethane, or rubber.

In one embodiment, the attachment portion is in the form of a pad. The pad can have a concave curvature configured to conform to a user's digit.

In another embodiment, the attachment portion is a sleeve. In one form, the sleeve has a generally tubular body defining a first opening configured to receive a user's digit inserted therethrough and further defines a rounded end configured to abut an end of a user's digit. In one form, the rounded end defines a slot extending therethrough configured to allow a user's fingernail to extend therethrough. In one form, the sleeve is configured to extend past at least one joint of the user's digit. In another form, the sleeve is resiliently formed to bias the sleeve closed in response to outward stretching of the sleeve when a user's digit is inserted therein In one aspect, the device further includes a microprocessor embedded in the at least one layer, a microprocessor in communication with a storage medium, a fingerprint detection device in communication with the microprocessor, wherein the conductive nipple is in communication with the microprocessor to transmit information stored within the storage medium in response to confirming a detected fingerprint with a fingerprint template stored in the storage medium.

DETAILED DESCRIPTION OF THE PREFERRED EMBODIMENTS

With reference to the figures, a touchscreen input device 10 is provided having an attachment portion 12 with a conductive nipple 14 coupled thereto. The device 10 is configured to be worn by a user and to provide an electric current to a capacitive touchscreen interface, such as those associated with consumer devices such as smartphones and other computing devices having a touchscreen interface.

Figure 1:
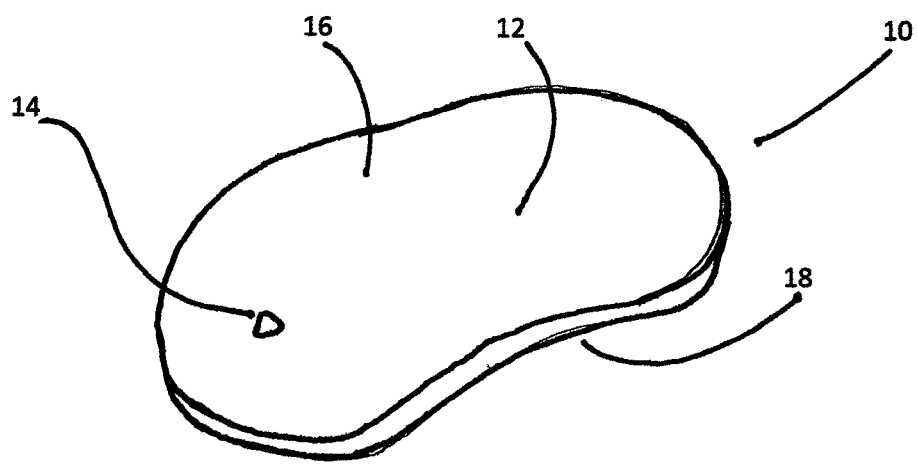
FIG. 1 is an isometric view of a pad having a conductive nipple.

With reference to FIG. 1, the attachment portion 12 can be in the form of a wearable pad 16 that is configured to be attached to the fingertip of a user. The pad 16 can be formed from at least one layer and preferably a plurality of layers 18 that combine to provide an attachment to the user's finger as well as house the conductive nipple 14.

Figure 2:
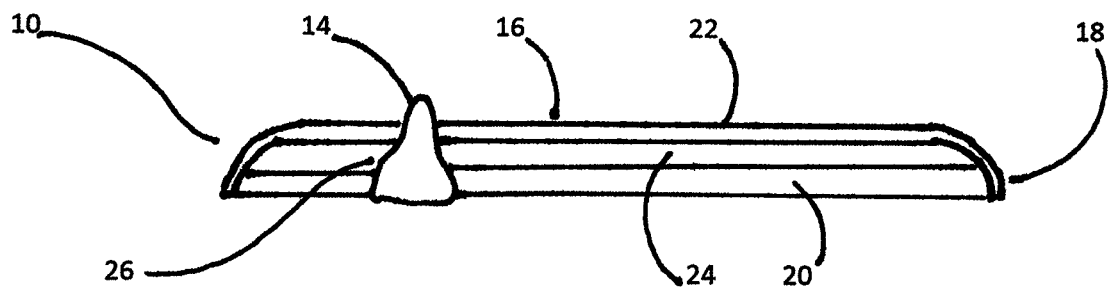
FIG. 2 is a cross-sectional view of the pad and the nipple, illustrating a plurality of layers of the pad.

More specifically, and with reference to FIG. 2, the plurality of layers 18 can include an adhesive layer 20 (i.e. bottom layer). The adhesive layer 20 is sized and configured to contact and adhere to the skin of the fingertip pad of the user. The plurality of layers 18 can also include a flocking layer 22 (i.e. top layer), and an intermediate layer 24 that is sandwiched between the flocking layer 22 and the adhesive layer 20. The nipple 14 generally protrudes past the surface of the flocking layer 22 and is generally flush with the surface of the adhesive layer 20. It will be appreciated that references to top and bottom are meant to correspond to an orientation relative to the pad of the user's fingertip facing upward. As used herein, "generally flush" means approximately +/− 25% of the thickness of the plurality of layers 18. In one form, the bottom of the nipple 14 that contacts the skin of the user is coplanar with the bottom of the plurality of layers 18.

Thus, with reference to FIG. 2, the plurality of layers 18 have a generally stacked configuration. It will be appreciated that the various layers have varying thicknesses. In one form, the adhesive layer is between about 0.003 inches and 0.010 inches, the intermediate layer 24 is between about 0.0156 inches and 0.05 inches thick, and the flocking layer 22 is between about 0.0156 inches and 0.020 inches. The nipple 14 can protrude between about 0.003 inches and 0.03 inches. The total thickness of the plurality of layers 18, including the protrusion of the nipple 14, can be between about 0.0156 inches and 0.0625 inches.

In another embodiment, the flocking layer 22 can have a thickness range of 0.015 to 0.025 inches. In another embodiment, the adhesive thickness can be between 0.005 and 0.01 inches. In another embodiment, the total thickness of the layers 18 and nipple 14 is between 0.02 and 0.10.

It will be appreciated that various combinations of thicknesses could also be used to suit the particular needs of the user.

The pad 16 includes an opening 26 extending through the plurality of layers 18 that is sized and configured to receive and house the conductive nipple 14, such that the nipple 14 is retained within the pad 16 and extends through the pad 16 and will come in contact with the user's skin when the pad 16 is attached to the user's finger, and will protrude from the opposite side to provide an output point.

Figure 3A:
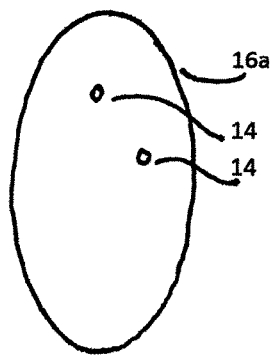
FIGS. 3A-3C are plan views of pads having different sizes and different quantities of nipples.
Figure 3B:
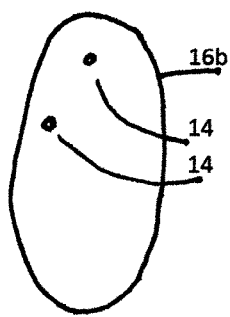
Figure 3C:
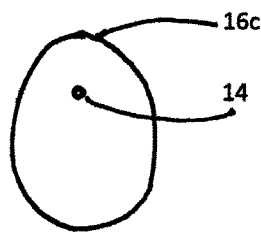

With reference to FIGS. 3A, 3B, and 3C, the pad 16 can have a generally ovular or circular profile when viewed from above. FIG. 3A illustrates a pad 16a configured for use on a user's left thumb. FIG. 3B illustrates a pad 16b for use on a user's right thumb. FIG. 3C illustrates a pad 16c for use on a user's index finger. The pad 16 is preferably sized to conform to the user's fingertip, and it will be appreciated that various finger shapes and sizes exist that can affect the preferable size of the pad 16 for a particular user. Of course, other shapes, such as square, rectangular, polygonal, etc. can also be used for the pad 16.

In one embodiment, the pad 16a can have a width of between about 0.375 and 0.625 inches and a length of between about 0.625 to 1.0 inches. The pad 16b can have a width of between about 0.375 and 0.625 inches and a length of between about 0.625 to 1.0 inches. The pad 16c can have a width of between about 0.25 and 0.5625 inches and a length of between about 0.5 to 1.0 inches.

In other embodiments, the pads 16a and 16b can have a length range of 0.625 to 0.875 inches, and the pad 16c can have a width range of 0.312 to 0.5625 inches and a length range of 0.5 to 0.75 inches.

Of course, these sizes and ranges are merely exemplary for use with general thumb and finger sizes. It will be appreciated that other size ranges could also be used to conform to other possible sizes of a user's digits.

The pad 16 has been described as including a single nipple 14. However, with reference again to FIGS. 3A and 3B, it will be appreciated that the pad 16 can include additional nipples 14, depending on the needs or desires of the user. For example, the pad 16 can includes two nipples 14 embedded therein. In this embodiment, the pad 16 would include an additional opening 26 through the plurality of layers 18 to accommodate the additional nipple 14.

The nipple 14 can be located at different locations within the pad 16 to accommodate the needs or desires of the user. In one approach, the nipple 14 is located in an off-center position, such that the pad 16 can be attached to the finger and oriented with the nipple 14 being located near the tip of the finger. The same pad 16 with the offset positioning of the nipple 14 could also be oriented and attached such that the nipple 14 is located further from the fingertip. In another form, the nipple 14 can be located at the center of the pad, such that the orientation of the pad 16 when installed does not generally matter.

As described above, the pad 16 can be various shapes and sizes to accommodate different finger sizes or the desires of the user. In one approach, the pad having two nipples 14 can be larger than the pad 16 having a single nipple 14. The larger pad 16 can be preferably designed to accommodate a user's thumb, which generally has a larger fingertip pad to which the device 10 can be attached. In the embodiments shown in FIGS. 3A and 3B, the nipples 14 can be arranged to be disposed at the tip of the thumb and at the side of the thumb closest to the index finger. Of course, the nipples 14 could arranged at other locations on the pad 16 to accommodate different user needs.

Figure 4A:
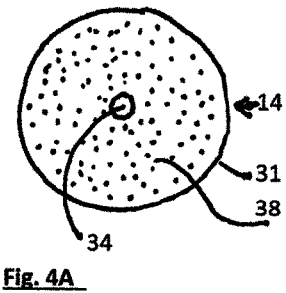
FIG. 4A is a top plan view of the nipple.
Figure 4B:
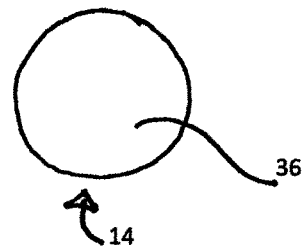
FIG. 4B is a bottom plan view of the nipple.
Figure 4C:
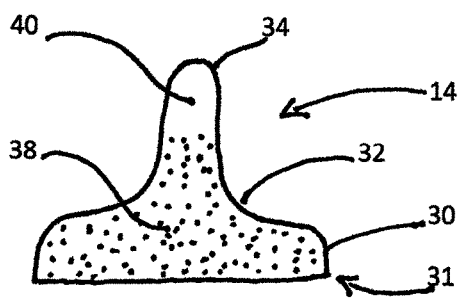
FIG. 4C is a front view of the nipple.

With reference to FIGS. 4A-4C, the nipple 14 can have a complex curvature when viewed from the front (FIG. 4C), with a convex portion 30 of a base 31 that transitions into a concave portion 32 in the middle, and a rounded tip 34. The nipple 14 can have a generally round profile when viewed from the top (FIG. 4A) or bottom (FIG. 4B). The nipple 14 can have a decreasing lateral thickness, such that the nipple 14 is wider at the base 31 than the tip 34. However, it will be appreciated that other shapes of the nipple 14 could also be used that provide a base for contacting a user's skin and a tip for contacting a touchscreen.

Additionally, the nipple 14 can have more than one type of surface roughness. In one form, a bottom surface 36 can be generally smooth, the convex portion 32 and concave portion 34 can have a rough outer surface 38, and the rounded tip 34 can have a smooth outer surface 40. The smooth bottom surface 36 provides added comfort to the user when the device 10 is attached to the user's finger. The smooth rounded tip 34 provides a smooth interface between the nipple 14 and the touch screen surface, thereby reducing instances of scratching that may occur due to contact with the touch screen. The rough outer surface 38 can aid in retaining the nipple 14 within the pad 16.

The nipple 14 can be made from a variety of conductive materials including, but not limited to, carbon based silicone, copper, silver, aluminum, gold, composite metals or metal alloys, and the like.

In one embodiment, the nipple 14 can have a height of between about 0.06 inches and 0.10 inches. The width of the base 31 can be between about 0.15 inches and 0.25 inches, with a preferable width of about 0.1875 inches. The rounded tip 34 can have a width of between about 0.015 inches and 0.050 inches, with a preferable width of about 0.02 inches.

In another embodiment, the nipple 14 can have a height range of 0.06 to 0.1875 inches. The width of the base 31 can be between 0.03125 and 0.125 inches. The width of the tip 34 can be between 0.015 and 0.0625 inches.

Figure 5:
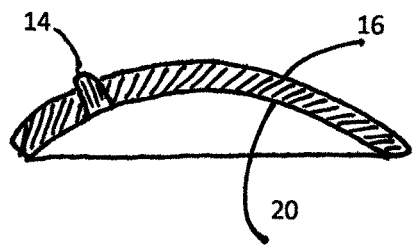
FIG. 5 is a cross-sectional view of the pad and nipple, with the pad having a concave shape.

The pad 16 has been described above with reference to a generally flat shape. However, it will be appreciated that non-flat shapes could also be used. For example, the pad 16 could have a generally curved or cup shape (FIG. 5), such that the adhesive layer 20 has a generally concave shape to conform to the rounded end of a user's finger, thereby increasing the contact area relative to a flat pad 16.

The pad 16 generally acts as an insulator to insulate the portion covering the finger from making contact with the touch screen, thereby limiting instances of unintentional or misplaced activation of the touchscreen by the finger. This insulation is provided by the non-conductive nature of the pad 16. As described above, the pad 16 includes the plurality of layers 18. The plurality of layers 18 act as the insulation. In one form, the intermediate layer 24 is made from silicone, rubber, or other non-conductive elastic material. The intermediate layer 24 is generally flexible, so that it can easily conform to the rounded shape of a user's fingertip or fingertip pad.

The adhesive layer 20 can be in the form of a coating applied to the intermediate layer 24. In this approach, the adhesive layer 20 is an adhesive applied to the intermediate layer 24. The adhesive can be any type of adhesive appropriate for temporary use on human skin, such as the adhesive used on disposable bandages or temporary skin decorations. In this approach, the adhesive can include a removable film (not shown) that protects the adhesive and prevents application thereof prior to application of the device 10 to the user's skin.

Similarly, the flocking layer 22 can be in the form of a textile or similar material applied to the intermediate layer 24 to provide a desired tactile feel, as well as allowing for various appearances, such as different colors. The flocking layer 22 is also non-conductive, thereby preventing undesired or misplaced inputs on the touch screen by the user in the event of contact between the flocking layer 22 and the touch screen interface. As such, activation of the touchscreen will remain generally limited to the location of the nipple 14, even if contact is made by portions of the pad 16 surrounding the nipple. The flocking layer 22 can provide for a generally slippery engagement with the touchscreen relative to the areas of the pad 16 without flocking material, allowing the user to slide their finger across the screen with reduced frictional engagement, allowing the user increased precision with which to activate the touchscreen with the nipple 14.

The above described pad 16 can be used as a disposable embodiment, where the device 10 can be disposed of after use. However, other adhesives could be used to allow the device 10 to be removed from the finger and subsequently re-attached.

Figure 6:
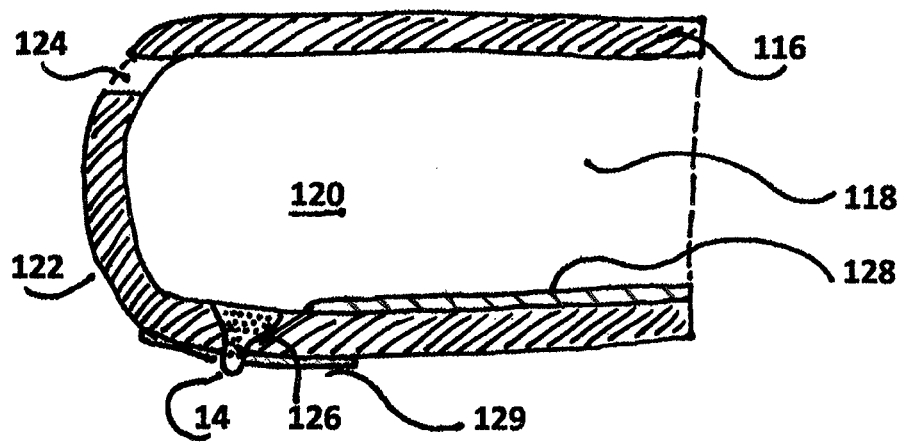
FIG. 6 is a cross-sectional view of a sleeve having a nipple and a slot.
Figure 7:
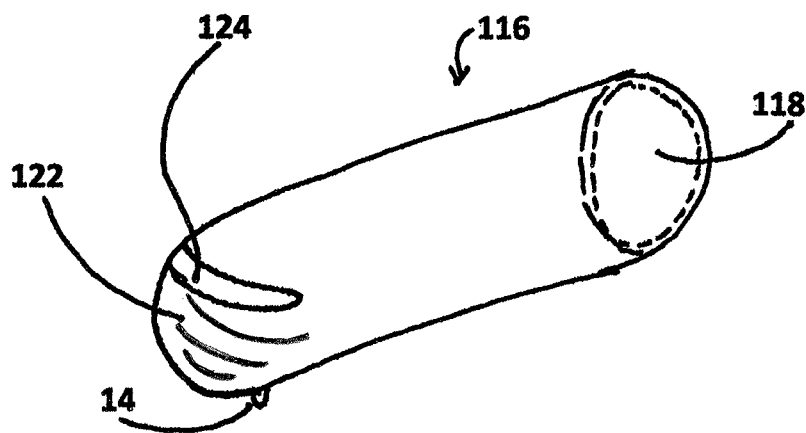
FIG. 7 is an isometric view of the sleeve having the nipple and the slot.
Figure 8:
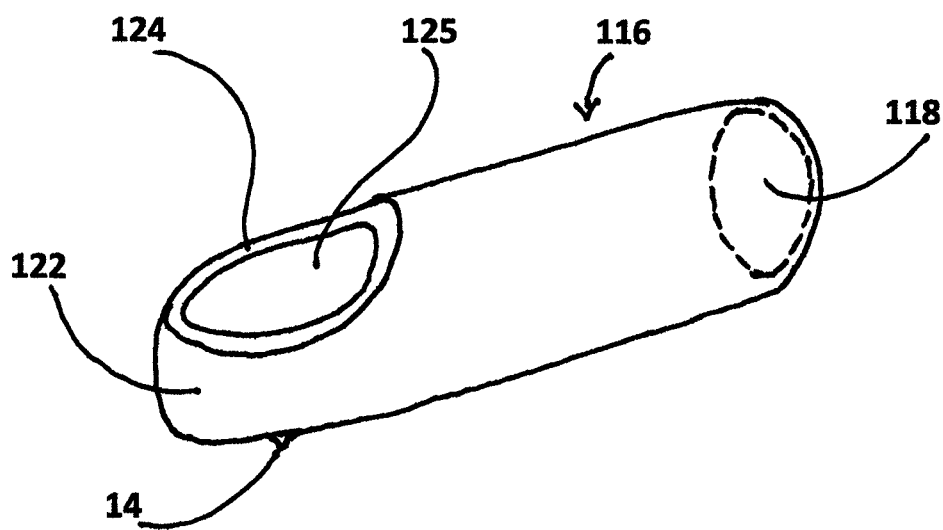
FIG. 8 is an isometric view of another embodiment of the sleeve having a window.

With reference to FIGS. 6-8, in another embodiment, the device can be in the form of a sleeve 116 that includes the nipple 14 in a manner similar to the pad 16. However, unlike the pad 16 described above, the sleeve 116 is configured to extend over and around the user's finger. The sleeve 116 can therefore be sized differently to accommodate different finger shapes and sizes. The sleeve 116 can be made from an elastic material, such as silicone or rubber, allowing it to stretch over a user's finger, and be biased toward the user's finger to be retained thereon.

The sleeve 116 includes a first opening 118, through which the user's finger can extend. The sleeve 116 also defines a cavity 120 therein to receive the finger. At the end of the sleeve 116 opposite the first opening 118 is a rounded end 122 that will generally conform to the rounded end of a user's finger. Optionally, the sleeve 116 can include a nail opening 124 through a portion of the rounded end 122. This nail opening 124 can be in the form of a slot or a slit, allowing a user's fingernail to extend therethrough when the fingertip is received within the cavity. In another approach, the nail opening 124 could be in the form of a window 125 (FIG. 8) that is generally sized to expose the majority of a user's fingernail.

Similar to the pad 16, the sleeve 116 can include an opening 126 therethrough to receive the nipple 14. As described above, depending on the needs of the user or the desired finger on which the sleeve 116 is attached, additional nipples 14 and openings 126 can be used. For example, two nipples 14 and openings 126 can be used for a thumb sized sleeve 116, similar to the arrangement of multiple nipples 14 described above with respect to the pad 16.

The sleeve 116 can be used without an adhesive, because the sleeve 116 is retained on the finger due to the elasticity of the material. However, optionally, an adhesive 128 (FIG. 6) could be applied to an internal surface of the sleeve 116 if additional retention is desired.

The sleeve 116 can also optionally include a flocking material 129 (FIG. 6) applied to at least a portion of the sleeve 116. If used, it can be applied to the entire outer portion of sleeve 116 or just the portion surrounding the nipple 14.

The sleeve 116 can be sized to accommodate various finger sizes. In one form, the length of the sleeve 116 can be between about 1.0 and 1.5 inches, and the diameter of the sleeve 116 can be between about 7/16 and 13/16 inches. Of course, it will be appreciated that other sizes could also be used to accommodate finger sizes that fall outside of the above described size ranges.

The device 10 can also be used to recognize a unique user's biometric information. Biometric security identifies multiple unique markers that are specific to individual persons that are not shared with others. Biometric security uses minutiae points such as ridge bifurcations or ridge endings that are unique to each individual. The device 10 can be configured to store a template of a unique user's fingerprint in a storage device 210 embedded in the device.

Figure 9:
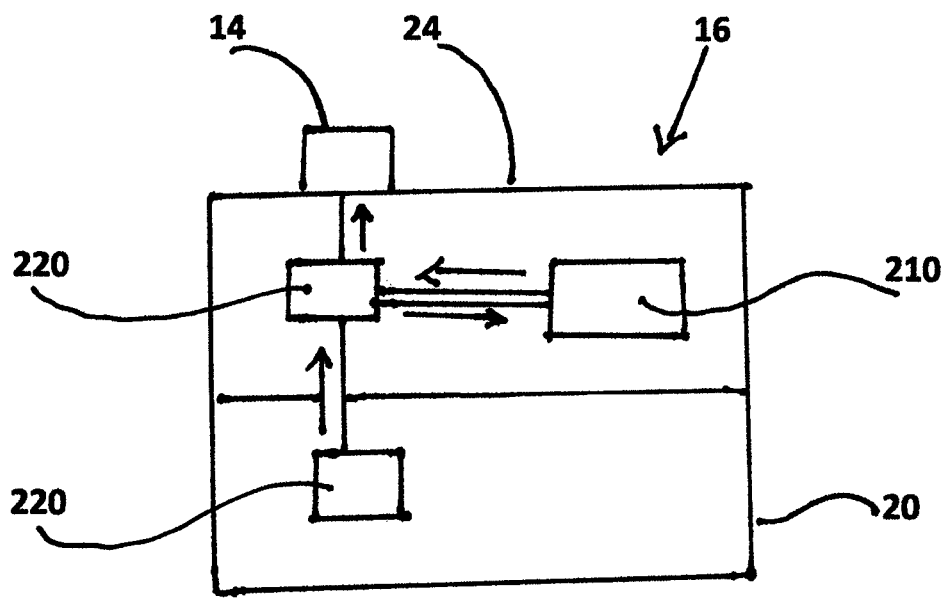
FIG. 9 is a schematic view of a fingerprint reading device, a microprocessor, and a storage device associated with the pad.

With reference to FIG. 9, the device 10 can include a microprocessor 220 embedded within the intermediate layer 24 that is in communication with the storage device 210 that stores the fingerprint template. The device 10 can also include a fingerprint reading device 220 disposed on the adhesive layer 20 that comes in contact with the user's fingerpad.

The nipple 14 is in communication with the microprocessor 220, such that confidential data can be transmitted through the nipple 14 to a receiving device at a terminal. The confidential data can include various forms of personal data, such as credit card info, social security number, banking information, user login names, user passwords, or the like. Upon reading the user's fingerprint by the reading device 220, the microprocessor 220 will confirm that the stored fingerprint template corresponds to the read fingerprint, and will transmit the confidential data through the nipple 14 to the terminal. The storage device 210 can store multiple fingerprint templates that correspond to individual users, if desired. In this approach, the microprocessor will determine whether the fingerprint of a user corresponds to one of the stored fingerprint templates, and will transmit the information associated with a confirmed user.

In the event an unauthorized user's fingerprint is detected, the confidential information stored in the device will be inaccessible.

The device 10 can also include a communications port (not shown) configured to communicate with an external programing device in order to set up the device 10 with the user's information or to edit the user's stored information. The communications port can be any type of known wireless or wired communications port.

The above described biometric security features are preferably used with a device 10 having the pad 16. However, it will be appreciated that the same features could also be incorporated into the device 10 that includes the sleeve 116.

Figure 10:
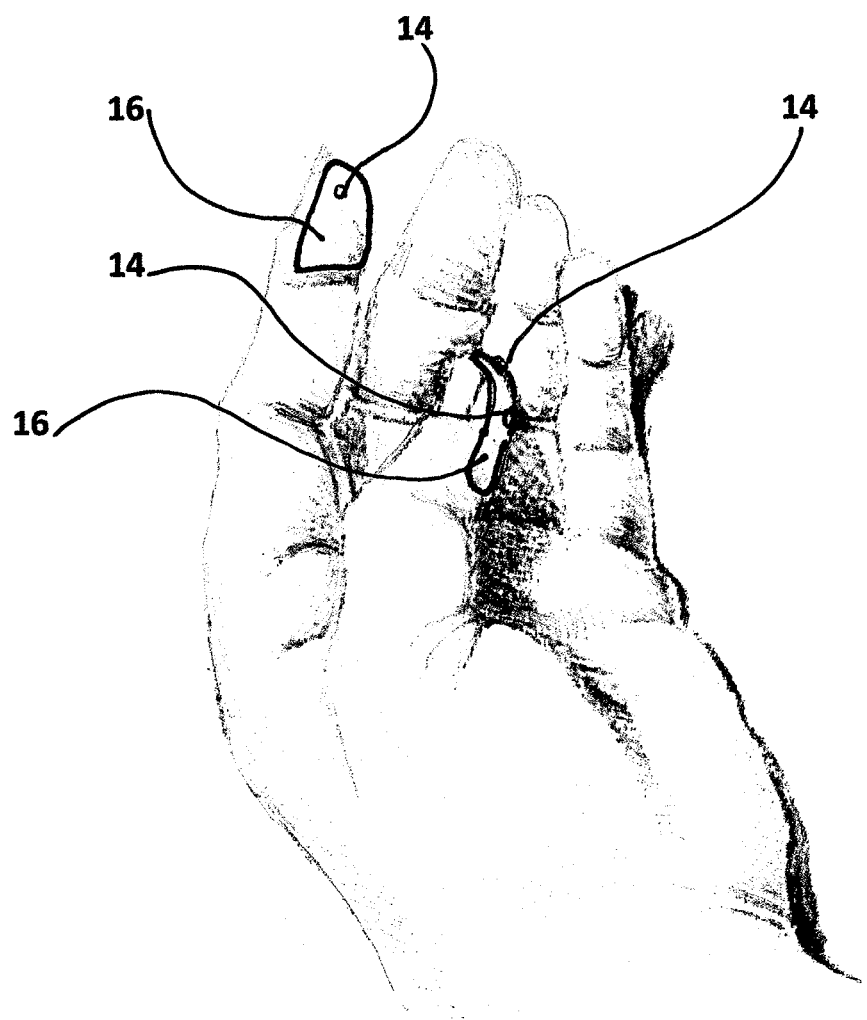
FIG. 10 illustrates pads affixed using adhesive to the thumb and index finger of a user.
Figure 11:
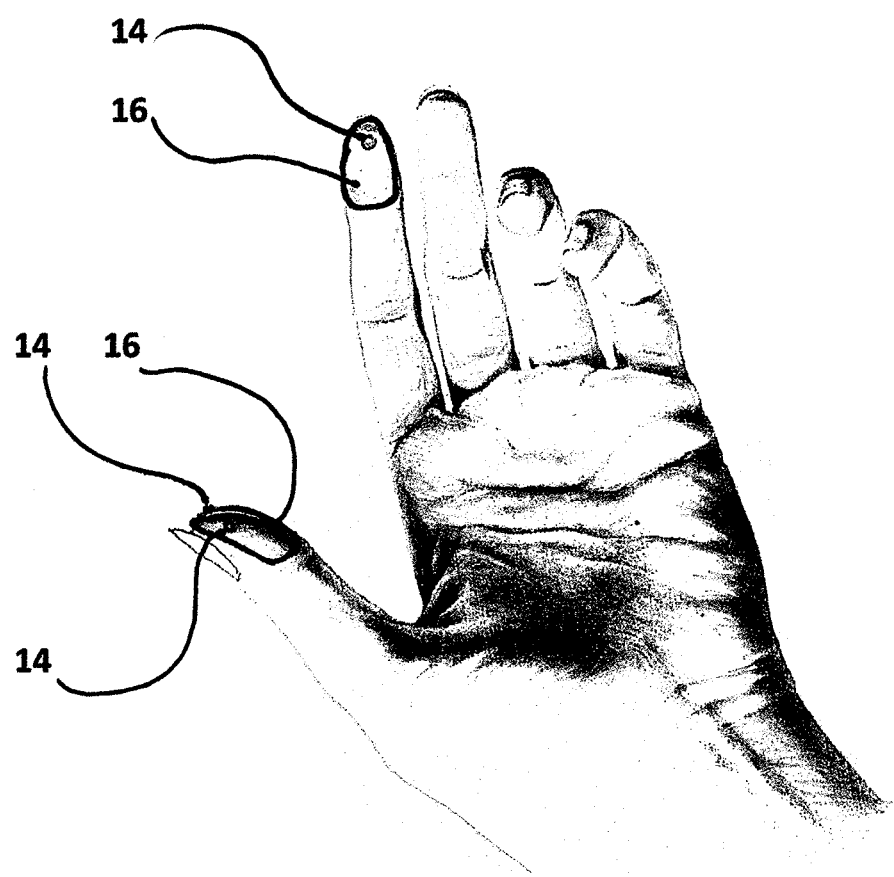
FIG. 11 illustrates pads affixed using adhesive to the thumb and index finger of a user having longer fingernails.
Figure 12:
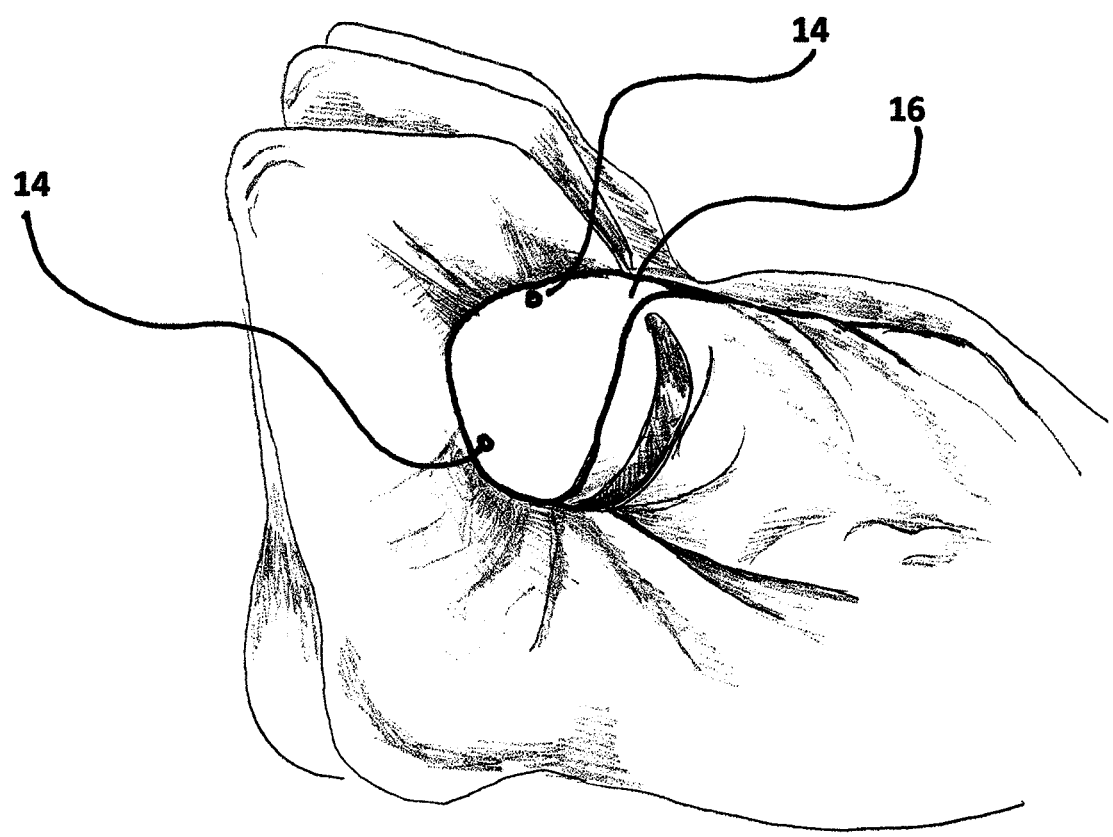
FIG. 12 illustrates a pad affixed using adhesive to the thumb of a user.
Figure 13:
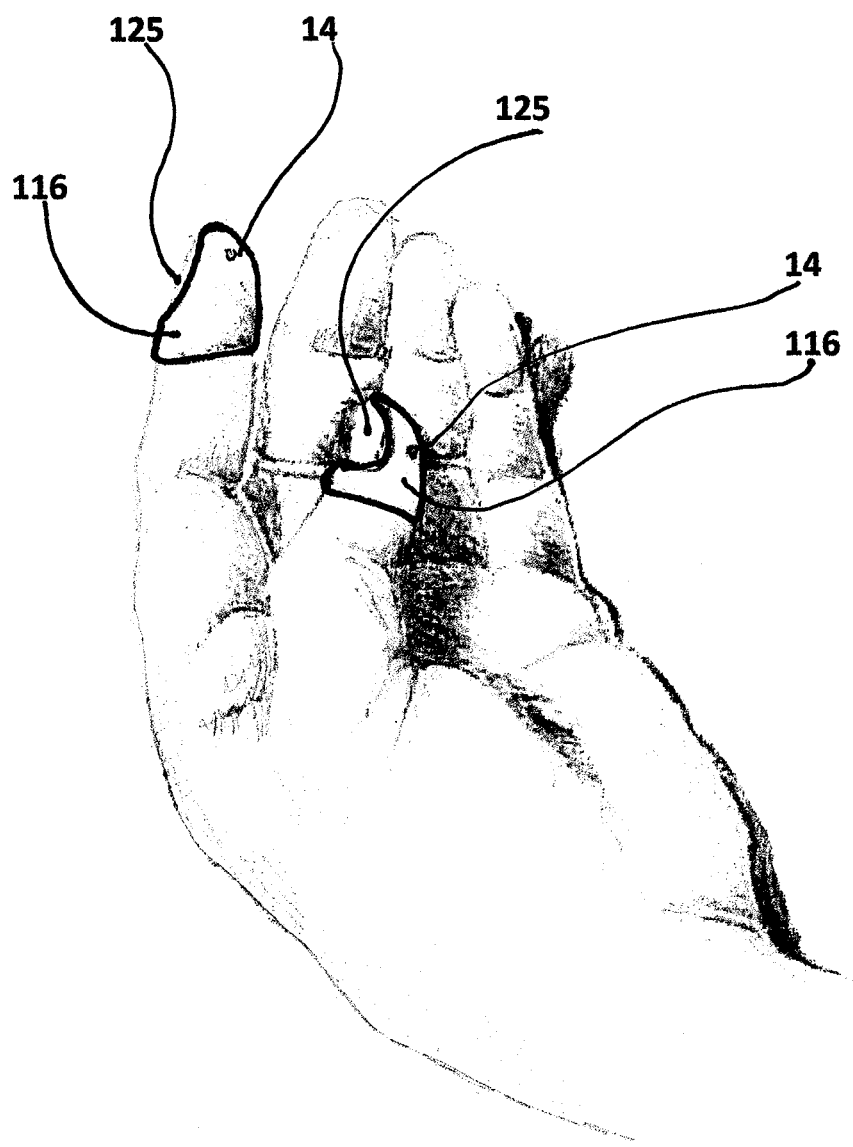
FIG. 13 illustrates sleeves attached to the thumb and index finger.
Figure 14:
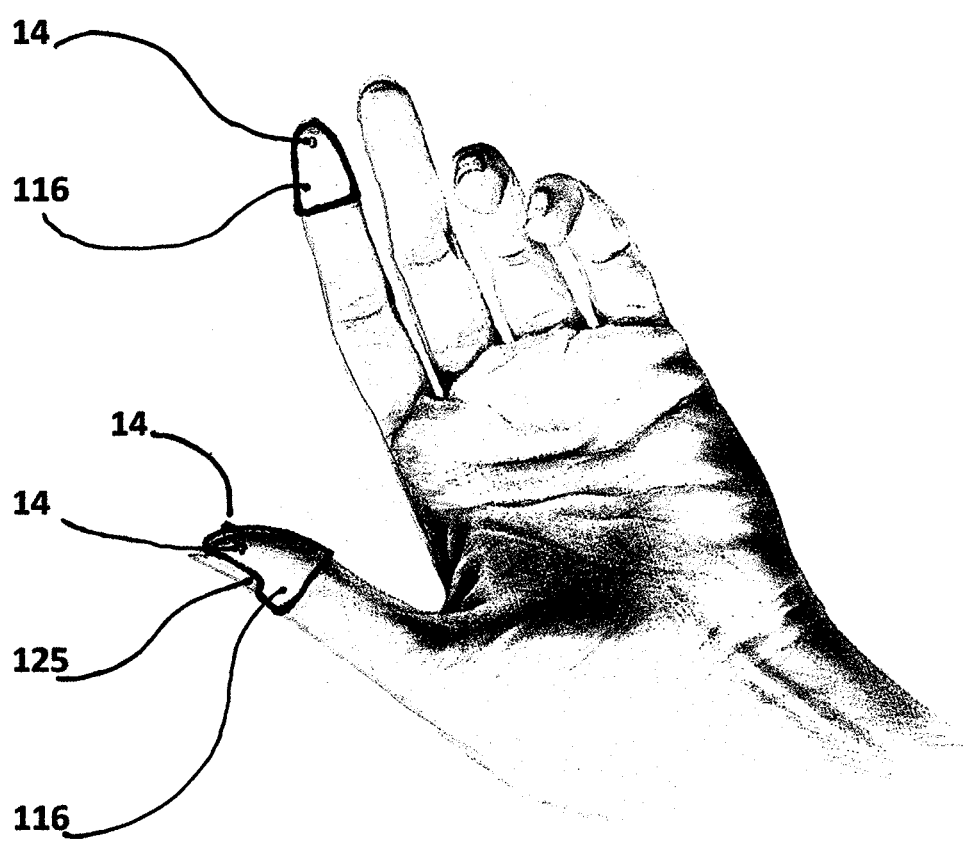
FIG. 14 illustrates sleeves attached to the thumb and index of a user having longer fingernails.
Figure 15:
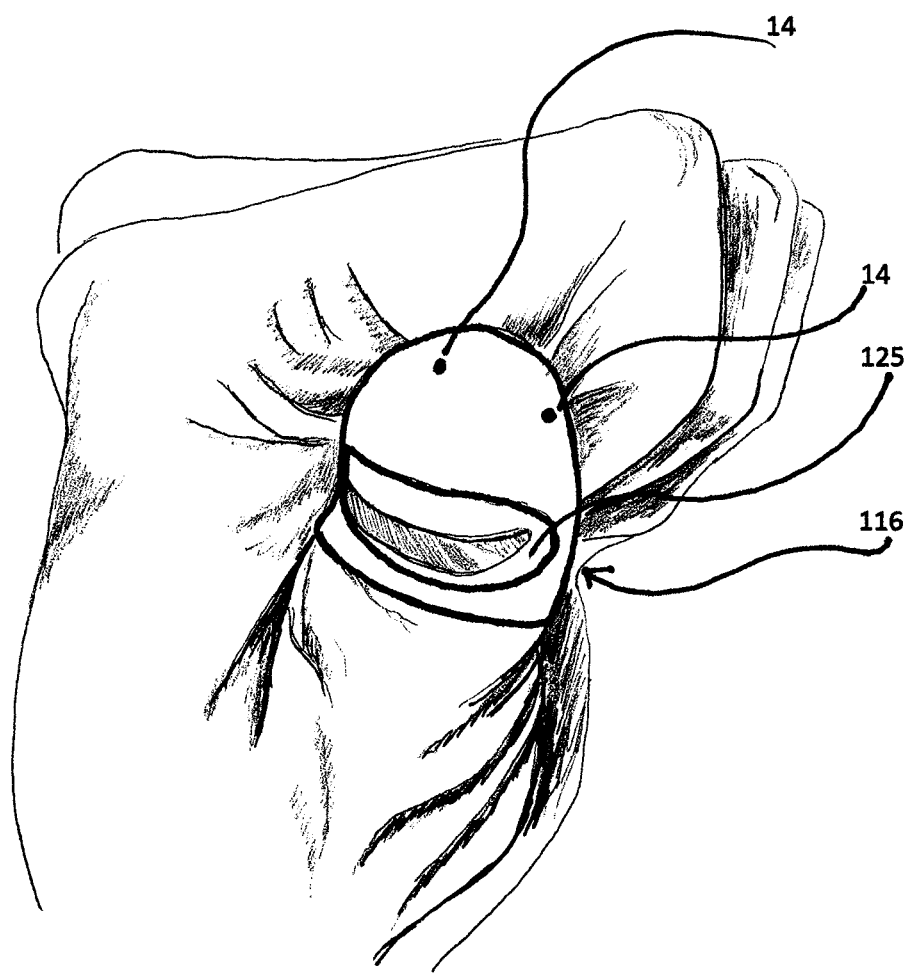
FIG. 15 illustrates a sleeve attached to the thumb of a user.

The use of the pads 16 and 116 installed on a user's finger are illustrated generally in FIGS. 10-15. The pads 16 or 116 are shown being worn on the thumbs and/or index finger of a user, illustrating users with either short or long nails. More particularly, FIGS. 10-12 illustrate the pad 16 being worn on the fingerpad of a finger/thumb of a user. FIGS. 13-15 illustrate the pad 116 being worn over the end of a user's finger/thumb, with the user's nail protruding through the opening 124 or window 125 described above.

While the above description constitutes the preferred embodiment of the present invention, it will be appreciated that the invention is susceptible to modification, variation and change without departing from the proper scope and fair meaning of the accompanying claims.

What is claimed is:

1. A device for aiding in the activation of a touchscreen by a user's digit, the device comprising:
   an attachment portion configured for being removably attached to an end of the user's digit, the attachment portion including at least one layer, the at least one layer being non-conductive and flexible; and
   a conductive nipple coupled to the attachment portion, the conductive nipple including an inner end and an outer end, the inner end being configured for contacting a portion of skin of the user's digit when the attachment portion is attached to the user's digit, the outer end being configured for activating a touchscreen;
   wherein the conductive nipple extends through the at least one layer through an opening defined by the at least one flexible layer;
   wherein the attachment portion is a pad that is not a sleeve;
   wherein the conductive nipple protrudes from one side of the at least one layer at an outer end of the opening and is coplanar with the opposite side of the at least one layer at an inner end of the opening;
   wherein the inner end of the conductive nipple defines a base surface;
   wherein the base surface extends entirely across a width of the inner end of the opening, and the conductive nipple has a solid cross-section that fills the inner end of the opening;
   wherein an innermost surface of the at least one layer and the base surface combine to define a coplanar surface.

2. The device of claim 1, wherein the at least one layer comprises a plurality of layers, wherein the plurality of layers comprises a bottom layer, an intermediate layer, and a top layer, wherein the bottom layer is configured to contact the user's skin.

3. The device of claim 2, wherein the bottom layer comprises an adhesive.

4. The device of claim 1, wherein the at least one layer comprises one of silicone, fabric, urethane, or rubber.

5. The device of claim 2, wherein the top layer comprises flocking material.

6. The device of claim 1, wherein the conductive nipple has a complex curvature having a convex portion transitioning into a concave portion transitioning into a rounded tip, wherein a width of the conductive nipple continually decreases without increasing in a direction from the inner end of the nipple to the outer end of the nipple.

7. The device of claim 6, wherein the convex portion is wider than the concave portion, and the concave portion is wider than a transitional portion between the concave portion and the rounded tip.

8. The device of claim 6, wherein the rounded tip is disposed at the outer end of the conductive nipple, and the convex portion defines a base that is disposed at the inner end of the conductive nipple.

9. The device of claim 6, wherein the rounded tip is smoother than the remainder of the nipple.

10. The device of claim 1, wherein the conductive nipple is a first conductive nipple and further comprising a second conductive nipple extending through a second opening in the at least one layer, wherein the second conductive nipple is arranged in an off center position on the pad and the first conductive nipple is arranged at a tip of the pad such that the first and second nipples are spaced apart.

11. The device of claim 1, wherein the pad has a concave curvature configured to conform to a user's digit.

12. The device of claim 1, wherein the conductive nipple protrudes from one side of the at least one layer and is flush with the opposite side of the at least one layer.

13. The device of claim 1, wherein the inner end of the conductive nipple does not overlap the innermost surface of the at least one layer.

14. The device of claim 1, wherein the opening defines a width thereof, and the inner end of the conductive nipple has a width that conforms to the width of the opening.

15. A device for aiding in the activation of a touchscreen by a user's digit, the device comprising:
   an attachment portion configured for being removably attached to an end of the user's digit, the attachment portion including at least one layer, the at least one layer being non-conductive and flexible; and a conductive nipple coupled to the attachment portion, the conductive nipple including an inner end and an outer end, the inner end being configured for contacting a portion of skin of the user's digit when the attachment portion is attached to the user's digit, the outer end being configured for activating a touchscreen;

wherein the conductive nipple extends through the at least one layer through an opening defined by the at least one layer;

wherein the attachment portion comprises a sleeve;

wherein the sleeve has a generally tubular body defining a first opening configured to receive a user's digit inserted therethrough and further defines a rounded end configured to abut an end of a user's digit; and wherein the conductive nipple protrudes from one side of the at least one layer at an outer end of the opening and is coplanar with the opposite side of the at least one layer at an inner end of the opening;

wherein the inner end of the conductive nipple defines a base surface;

wherein the base surface extends entirely across a width of the inner end of the opening, and the conductive nipple has a solid cross-section that fills the inner end of the opening;

wherein an innermost surface of the at least one layer and the base surface combine to define a coplanar surface.

16. The device of claim 15, wherein the sleeve is resiliently formed to bias the sleeve closed in response to outward stretching of the sleeve when a user's digit is inserted therein.

17. The device of claim 15 wherein the rounded end defines a slot extending therethrough configured to allow a user's fingernail to extend therethrough, wherein the slot is configured to allow the user's fingernail to project longitudinally through the rounded end while the tubular body of the sleeve covers the top of the user's fingernail, wherein the slot defines an opening that extends laterally across the rounded end and opens longitudinally and is blocked in a radially outward direction by the rounded end, wherein the slot has a lateral width and a longitudinal depth, and the longitudinal depth of the opening is defined by a thickness of the sleeve at the rounded end.

18. A device for aiding in the activation of a touchscreen by a user's digit, the device comprising:

an attachment portion configured for being removably attached to an end of the user's digit, the attachment portion including at least one layer, the at least one layer being non-conductive and flexible; and a conductive nipple coupled to the attachment portion, the conductive nipple including an inner end and an outer end, the inner end being configured for contacting a portion of skin of the user's digit when the attachment portion is attached to the user's digit, the outer end being configured for activating a touchscreen;

wherein the conductive nipple extends through the at least one layer through an opening defined by the at least one flexible layer;

a microprocessor embedded in the at least one layer, the microprocessor in communication with a non-transitory storage medium embedded in the at least one layer, wherein the non-transitory storage medium includes at least one fingerprint template stored therein, a fingerprint detection device in communication with the microprocessor, wherein the conductive nipple is in communication with the microprocessor, wherein the conductive nipple will transmit information, corresponding to one of the at least one fingerprint templates, stored within the non-transitory storage medium in response to confirming a detected fingerprint corresponds with one of the at least one fingerprint templates stored in the non-transitory storage medium, wherein the information is inaccessible in response to detecting a fingerprint that does not correspond to the fingerprint template stored in the non-transitory storage medium.

19. The device of claim 18 further comprising a communications port configured to communicate with an external programming device, wherein the information stored in the non-transitory storage medium is programmable and editable via the communications port.

20. The device of claim 18, wherein the at least one layer includes a first layer and a second layer, wherein the non-transitory storage medium and microprocessor are embedded in the first layer, and the fingerprint detection device is embedded in the second layer.

* * * * *